2,957,932
OIL-SOLUBLE EMULSIFYING AGENT

Sol B. Radlove, Chicago, Herbert T. Iveson, Elmhurst, and Percy L. Julian, Oak Park, Ill., assignors to The Glidden Company, Cleveland, Ohio, a corporation of Ohio No Drawing. Filed Aug. 4, 1954, Ser. No. 447,938

4 Claims. (Cl. 260—410.8)

This invention relates to improvements in emulsifiers. More particularly, it is concerned with emulsifiers having improved solubility in liquid glyceride oils and to the preparation of such emulsifiers from glycerine, higher fatty acids and edible hydroxy carboxylic acids.

It is well known in the glyceride art, that glycerol and higher fatty acids react with each other forming a mixture of approximately 40% mono-, 50% di-, and 10% triglycerides. United States Patent No. 2,509,414 to Barsky discloses a process wherein such a mixture of glycerides is reacted with an organic hydroxy carboxylic acid to form substantially neutral triglycerides wherein all of the glycerol hydroxyl groups present in the glyceride mixture have been esterified with hydroxy carboxylic acid residues. Such a procedure does not alter the number of free hydroxyl groups in the mixture but merely replaces the glyceryl hydroxyls originally present with hydroxy carboxylic acid hydroxyl groups. Thus, in the final composition produced according to this patent, the glyceride ratio of 40:50:10 has not been altered, the patented process acting to change the position of the free hydroxyls from the glycerol portion of the glyceride molecule to the hydroxy carboxylic acid portion. In copending application of Iveson, Julian, and Radlove, Serial No. 201,226, filed December 16, 1950, now U.S. Patent No. 2,690,971, it was shown that if the hydroxy carboxylic acid be present during the formation of the glyceride mixture, not only is the ratio of mono-, di-, and triglycerides altered, but also the character of the components of that mixture is changed. Thus, the mixture of that patent contains monoglyceride material, which may be the product of one mole of glycerine with one mole of higher fatty acid or with one mole of hydroxy carboxylic acid. Similarly, the diglycerides may be composed of products resulting from reaction of one mole of glycerine with (a) two moles of fatty acid, (b) one mole of fatty acid and one mole of hydroxy carboxylic acid, and/or (c) two moles of hydroxy carboxylic acid. By analogous reasoning at least six different types of triglycerides may make up the triglyceride portion of the mixture. Thus, the final composition produced according to the aforesaid patent is probably a mixture of the natural mixed glycerides, i.e., those containing free glyceryl hydroxyls, together with synthetic glycerides, i.e., those containing both glyceryl and hydroxycarboxylic acid hydroxyl groups. The hydrophyllic-lipophyllic balance of the composition, and hence the emulsifying properties, have been altered. Aqueous extraction of the reaction mixture removes the soluble components (monoglyceryl, mono-, di-, and trihydroxy carboxylic acid products) and the washed product has been shown to contain between 20% and 24% monoglyceride material. Thus, the expected 40:50:10 ratio has been substantially altered by the process of the Iveson et al. patent. The products of the latter patent are surprisingly more effective as an emulsifier component of plastic shortening compositions than are the Barsky products. However, we have found that emulsifier compositions of the Iveson et al. patent prepared by using from ½ to 1 molar equivalent of monohydroxy monocarboxylic acid have limited solubility in liquid glyceride oils. Inasmuch as for many applications in the field of food technology, it is desirable to utilize clear, emulsifier-containing, fluid oils capable of being blended with aqueous components, it is a prime objective of the present invention to prepare a novel group of oil-soluble emulsifying agents which can provide the desired clear oils.

Another object of this invention is to provide novel washed glyceride ester compositions possessing enhanced solubility in triglyceride oils.

A specific object is to prepare lacto-palmitate glyceride esters of improved oil solubility.

Other objects will in part be disclosed in, and in part be obvious from the following description of our invention.

We have found that mixed glyceride esters of improved solubility in triglyceride oils can be prepared by heating a mixture of 1 molar proportion of glycerine, 1 molar proportion of higher fatty acid having from 12 to 20 carbon atoms and at least 1.75, but not more than 3, molar proportions of a monohydroxy monocarboxylic acid at about 185° C. Most conveniently, the reaction is carried out under refluxing conditions adapted to remove the water formed in the esterification reaction and to permit the return to the mixture of the monohydroxy carboxylic acid if such is volatile to an appreciable extent during the reaction. Preferably, the fatty acid is selected to consist of at least 50% palmitic acid, and the monohydroxy monocarboxylic acid is lactic acid. As indicated hereinabove, the reaction mixture will usually contain minor amounts of mono-, di-, and trilactyl glycerides and additionally some unreacted glycerine, monohydroxy monocarboxylic acid, and polymers of the latter. For many purposes such materials impair the efficiency and desirability (e.g., flavor) of the emulsifier composition. Accordingly, it is preferred that such undesirable components be removed. In view of their relatively greater solubility in water than the effective components of the mixture, their removal is accomplished by washing the reaction mixture with water, or more preferably with dilute inorganic salt solution, e.g., aqueous sodium sulfate, aqueous sodium chloride, etc., after which the washed mixture is dried.

The preferred compositions of our invention are characterized, in part, by a small, but effective, content of monoglyceride component. We have found that the presence of not less than 5%, nor more than 10%, of monoglyceride material in our compositions (by weight) results in a product with the desirable oil-solubility without sacrifice of baking efficiency. The acid value, which is a measure of the amount of unreacted hydroxy carboxylic acid and fatty acid remaining in the composition, should for esthetic reasons (as when the composition is to be used in edible fields) be as low as convenient.

The reaction can be carried out at temperatures between about 160° C. and 200° C. Most conveniently, the reaction is carried out at about 185° C. At temperatures below about 160° C., side reactions, such as the polymerization of the monohydroxy carboxylic component tend to predominate. Above 200° C., likewise side reactions, such as dehydration of the hydroxyl groups, tend to occur.

The novel compositions are useful as emulsifiers in plastic shortenings. Pastry products and especially cakes prepared with plastic shortenings containing our novel emulsifiers have excellent texture and appearance, satisfactory volume, and other desirable characteristics. The batters of such products possess low specific gravities, which is a measure of the amount of air occluded by the mixture and is an indication of the improved character of our novel emulsifier compositions. Additionally, because of the improved oil solubility of our compositions, high grade liquid triglyceride oils containing our compositions are improved to the extent where they are eminently useful not only to prepare salad dressings but also for use as a liquid shortening in baking. Such oils are useful also for frying purposes since the improved emulsifier containing oils have a high smoke point approaching that of the oil itself and considerably higher than that which is obtainable with other commercially available edible emulsifiers known to the art. The following examples illustrate our invention:

EXAMPLE 1

A mixture composed of 167.0 g. of Neo-Fat 16 (a product of Armour & Co. having the following composition: Palmitic Acid—90%, Oleic Acid—4%, Stearic Acid—6%), 61.8 g. of 95% glycerine and 138 g. of 85% lactic acid (two molar equivalents) was heated during 20 minutes to 170° C., while passing a slow stream of carbon dioxide through the molten mixture. A vacuum of 4″ was then applied, which during the succeeding five hours, was gradually increased to 28″ to 29″. The temperature was permitted to increase to, and was maintained at 180° C., after the first two hours of the reaction. The reacting mixture was heated under total reflux, the water being separated from the lactic acid, with the latter being returned to the reaction mixture. After 7½ hours, the heating was discontinued and the reacted mixture was cooled to about 100° C. The mass was washed with 3 portions of 1 liter each of 3% aqueous sodium sulfate. Thereafter, the washed product was dried in vacuo in a steam bath. The dried product had an acid value of 18.5, an acetyl value of 118.0, and a monoglyceride content of 5.8%. The dried product was soluble at a 4% level in cottonseed oil at about 25° C.

EXAMPLE 2

A mixture of 10.5 g. of 95% glycerine, 23 g. of 85% lactic acid (two molar equivalents), 27 g. of commercial stearic acid, and 0.1 g. of stannous chloride dihydrate, added as a catalyst, was heated to and maintained at 165° to 175° C. for 2¾ hours. The reaction mixture was heated in a moderate vacuum and without a reflux arrangement. The mass was heated until the distillate was substantially free of water and thereafter it was cooled to about 25° C. The total mixture weighed 43.1 g. and had an acid value of 25.8.

The efficacy of the product of this example as the emulsifier component of shortening for cakes was tested as described in Example 1 of the Iveson et al. patent, a commercial emulsifier being tested similarly for purposes of comparison by blending various percentages of the emulsifier and of the commercial emulsifier with the glyceride oil shortening component of the following household cake formula:

7¾ oz. cake flour.
10½ oz. sugar.
3½ oz. shortening containing emulsifier.
½ oz. baking powder.
¼ oz. salt.
5½ oz. milk.

The foregoing ingredients were mixed together for two minutes at a medium speed on a power mixer. Then 3 oz. milk.
4½ oz. egg white.
¼ oz. vanilla extract.

were added and the whole was mixed for two minutes more at a medium speed. 15 oz. of the batter was weighed into an eight-inch pan and the batter was baked at 365° F. for 21 minutes. The volume of the cake and other characteristics, after baking, were determined and the respective volumes obtained from different percentages of emulsifier by weight on the shortening were correlated and are shown in the following data. In blending the different emulsifiers with the shortening component of the above cake formula, the procedure employed was to melt the emulsifier with about 3 times its weight of the shortening component, and then to thoroughly mix the melted materials into the remainder of the shortening component. It was found that this procedure gave reproducible results at all emulsifier levels. At the 3% level, our new product was slightly less effective than the commercial emulsifier used at the 4% level with respect to batter volume and cake layer volume, but more effective with respect to incorporation of air and moisture retention.

EXAMPLE 3

A mixture of 1020 g. of Neo-Fat 16, 384 g. of glycerol and 900 g. of 80% lactic acid (two molar equivalents) was heated in a current of carbon dioxide and under total reflux conditions at 185° C. for 12 hours. The reflux was passed into a separating device to remove the aqueous portion prior to returning the lactic acid portion to the reaction mixture. The mixture was heated in a vacuum of 2″ for the first six hours, 10″ for the next 3 hours, and full vacuum for the last 3 hours. Thereafter, the batch was cooled to about 90° C. and washed first with 900 cc. of water and then with 5 portions of 2000 cc. each of water. After the addition of 0.15 g. of citric acid, the washed product was dried by gradually heating it to 150° C. The resultant mixture had an acid value of 5.1, an acetyl value of 114.4 and a monoglyceride content of 6.6%.

The resulting composition was tested as the emulsifier agent of the shortening component in the pound cake recipe given at the bottom of column 2 of the Barksy U.S. Patent No. 2,509,414. At the same time, it was compared in this respect with (a) an emulsifier prepared according to Example 1 of that patent, with (b) an emulsifier prepared as described in Example 1 of the Iveson et al. patent, and as a control, with (c) a commercially available shortening. The results of these baking tests are shown in the following tabulation:

Table

| Emulsifier | | Batter | | Cake | |
|---|---|---|---|---|---|
| Percent | Kind | Physical Appearance | Sp. Gr. | Physical Appearance | Vol. |
| 4 | Control | Slightly Curdled | 0.760 | Fine Slightly irregular. Nice top | 1,175 1,160 |
| 10 | U.S. Pat. 2,690,971 | Smooth and Thick | 0.755 | ----do---- | {1,225 1,210 |
| 10 | U.S.P. 2,509,414 | Thin and Smooth | 0.935 | Fine, Slightly irregular. Poor, pale top | 1,075 1,100 |
| 10 | Ex. 3 of this application | Smooth | 0.655 | Fine, Slightly irregular. Nice top | 1,225 1,230 |

These results indicate the superior efficacy of the novel composition of our invention over that produced according to the Barsky patent. Further, they indicate by the lower specific gravity that our composition is surprisingly more effective as an agent for incorporating air into the cake batter than that of the Iveson et al. patent.

EXAMPLE 4

In an analogous manner to that described in Example 3 above, 1020 g. of Neo-Fat 16, 384 g. of 95% glycerine, and 738 g. of 85% lactic acid (a mol ratio of 1:1:1.75) were reacted. The product had an acid value of 2.3, an acetyl value of 127.5 and a monoglyceride content of 7.8%. In order to demonstrate solubility in vegetable oil, 4 g. of the emulsifier composition was dissolved in 96 g. of cottonseed oil at about 60° C. The solution was placed in an ice box maintained at 30° to 32° F. until the solution became distinctly cloudy (at least 1½ hours). Thereafter, the mixture was permitted to stand at about 25° C. for at least 10 hours. Compositions prepared according to this invention redissolved completely, i.e., the solution became clear and no solid precipitate was noticeable whereas similar compositions prepared in accordance with the Iveson et al. patent and Example 1 of Barsky Patent 2,509,414, rewarming to 25° C. gave cloudy solutions or solid residues in the oil. The greater oil solubility of the compositions of the present invention than those of the Iveson et al. patent is regarded as a surprising and totally unexpected result. We have found that this superior oil solubility is obtained when at least 1.75 molar proportions of the monohydroxy monocarboxylic acid are reacted with 1 molar proportion of glycerine and with about 1 molar proportion of the fatty acid. We have found, further, that the emulsifying properties decrease rapidly when more than 3 molar proportions of the monohydroxy monocarboxylic acid are used. We prefer to use 2 molar proportions of the hydroxy acid.

This surprising improvement in the oil solubility at about 25° C. which is characteristic of the mixed ester compositions of our invention can be explained by theoretical considerations. During the reaction according to our novel process, a portion of the glyceryl hydroxyl groups are exchanged for monohydroxy monocarboxylic hydroxyl groups, e.g., lactyl hydroxyl groups. The unique ratio of glyceryl hydroxyls to lactyl hydroxyls present in the mixtures of our invention results in a stronger lipophyllic effect than those ratios of these groups obtained in the prior art mixtures. This result was unexpected since it would have been more reasonable to predict that the solubility in oil of our compositions would be intermediate between the Iveson, et al., products, which contain the highest ratio of glyceryl hydroxyls to lactyl hydroxyls, and the Barsky products which contain the smallest proportion of glyceryl hydroxyls to lactyl hydroxyls.

From the foregoing description and examples, it will be understood that our invention is concerned with the preparation and provision of improved emulsifier compositions especially suitable for use in conjunction with fluid oil carriers. Any triglyceride oil, and particularly a vegetable oil, which is fluid at room temperature, i.e., within the range of about 15° C. to about 30° C. is contemplated by our designation "fluid" or "liquid" oil. Such will include cottonseed, corn, soya, peanut, linseed, safflower, and the like oils. Of especial value are those oils which are specially treated to render them edible. Specially refined cottonseed oil and soyabean oil, for example, are in wide use as salad oils. The addition of the compositions of our present invention to such oils greatly increases their utility, since it has been shown that such oils containing the improved emulsifier(s) are equivalent to a plastic shortening in baking, cooking, and such other fields of application wherein plastic shortenings have been conventionally used. By virtue of the greater ease of handling a fluid composition as compared with a plastic composition, at least in the household field, this additional advantage is of primary importance. Our new emulsifiers are also valuable as whipping agents because of their ability to incorporate air into emulsions.

While the above examples demonstrate the preparation of specific compositions, it should be obvious to those skilled in this field that variations in the procedure and components are possible within the scope of our invention. Thus, various commercially available fatty acid products, other than Neo-Fat 16, can be used in practicing our invention. Neo-Fat I-56 (Armour and Co.) containing about 93% palmitic acid, triple pressed stearic acid which contains about 50% palmitic acid, and many others well known to the art can be selected and used in the invention according to the principles set forth hereinabove and to modifications thereof adapted to the particular product in which our compositions are to be used.

Further, monohydroxy monocarboxylic acids of 2–4 carbons other than lactic acid can be used. Thus, hydroxy-butyric acid, sarcolactic acid, and others having an odd or even number of carbon atoms in a straight or branched chain can be effectively used.

Again, a catalyst to facilitate the esterification reaction can be utilized, and instead of stannous chloride, we have found that such well known esterification catalysts as sulfuric and phosphoric acids, p-toluene sulfonic acid, and the like can on occasion be included in the reaction mixture for catalytic functions.

Having described our invention, what we claim is:

1. The method of preparing emulsifiers which are characterized by their ability to be wholly dissolved at 25° C. and at a 4% level in liquid, edible, triglyceride oils having shortening properties, said method consisting essentially of the steps: (I) simultaneously reacting together under esterifying conditions (a) one molar equivalent of glycerine (b) one molar equivalent of fatty acid comprising at least 50% by weight of palmitic acid with the remainder being composed predominantly of saturated fatty acid having 12–20 carbons, and (c) 1.75–3.0 molar equivalents of monohydroxy monocarboxylic acid of 2–4 carbons, at reflux temperatures between about 160° C. and 200° C. with removal of water liberated by the reactions until a substantial equilibrium has been reached in which the monoglyceride content is such that after steps II and III hereof have been completed, the monoglyceride content in the then dried mass will be between 5% and 10% by weight; (II) then washing said mixture to remove substantially all of its water-solubles; and (III) drying the washed material which remains.

2. The method as claimed in claim 1 wherein said molar equivalent of fatty acid is composed of at least 50% palmitic acid remainder essentially stearic acid.

3. The method as claimed in claim 2 wherein the monohydroxy monocarboxylic acid is lactic acid and is employed in step I an amount of about 2 molar equivalents.

4. An emulsifier as prepared by the method of claim 3.

References Cited in the file of this patent

UNITED STATES PATENTS

| 2,480,332 | Little | Aug. 30, 1949 |
| 2,509,414 | Barsky | May 30, 1950 |
| 2,584,998 | Filachione | Feb. 12, 1952 |
| 2,690,971 | Iveson et al. | Oct. 5, 1954 |
| 2,745,749 | Feuge et al. | May 15, 1956 |

OTHER REFERENCES

Ralston: Fatty Acids and Their Derivatives, 1948, page 544.

McCutcheon: Synthetic Detergents, 1950, pages 45–47.